United States Patent [19]

Gorris

[11] Patent Number: 4,495,812

[45] Date of Patent: Jan. 29, 1985

[54] METHOD AND DEVICE FOR BALANCING CIRCULAR PLATE-SHAPED OBJECTS

[75] Inventor: Joannes J. H. M. Gorris, Eindhoven, Netherlands

[73] Assignee: U.S. Philips Corporation, New York, N.Y.

[21] Appl. No.: 530,806

[22] Filed: Sep. 9, 1983

[30] Foreign Application Priority Data

Sep. 22, 1982 [NL] Netherlands ......................... 8203669

[51] Int. Cl.³ .............................................. G01M 1/38
[52] U.S. Cl. ........................................ 73/468; 73/487
[58] Field of Search ........................... 73/66, 468, 487; 82/1 C, 1.1; 408/2

[56] References Cited

U.S. PATENT DOCUMENTS

| 1,319,928 | 10/1919 | Kennedy | 73/66 X |
| 2,327,608 | 8/1943 | Saltz | 73/66 X |
| 2,448,751 | 9/1948 | Volkel | 82/1.1 X |

Primary Examiner—James J. Gill
Attorney, Agent, or Firm—Robert S. Smith

[57] ABSTRACT

A method and a device for balancing circular plate-shaped objects, in which the object is centered on means which are movable against spring force. The object is then clamped against a rotatable part which is rotated at a given speed. The object is then released, whereupon it undergoes a deviation from the axis of rotation which is proportional to the unbalance. Subsequently, the object is clamped again and the outer edge is turned to remove the unbalance.

7 Claims, 2 Drawing Figures

METHOD AND DEVICE FOR BALANCING CIRCULAR PLATE-SHAPED OBJECTS

The invention relates to a method of balancing a circular plate-shaped object, more particularly a disc with a readable information track, about a central axis of the object perpendicular to the plane of the object.

In the production of discs carrying information which is readable optically or by other means, the balancing of each disc is of great importance. Discs that are not, or not sufficiently, balanced give rise to problems when they are played.

Hitherto the balancing has involved ascertaining on a special measuring device the area and the extent of the unbalance and subsequently mounting the disc eccentrically on a separate machine on which by a turning operation the unbalance is removed. This method is laborious and time-consuming.

The invention has for its object to provide a balancing method in which the ascertaining of the extent and the area of the unbalance and the removal of this unbalance are performed in a single mounting.

The method according to the invention is characterized in that the object is centered with respect to a given vertical axis on means which are movable against spring force substantially in the plane of the object, after which the object is clamped against at least one rotatable part which is rotated at a given speed about a vertical axis, whereupon, while this part is rotating, the clamping is interrupted to release the object and is then applied again, after which the outer edge of the object is turned.

In the method according to the invention, the object to be balanced, which frequently is provided with a central hole is centered on the means which are movable against spring force. Subsequently, the object is clamped against the rotatable part and this part is rotated at a given instant, the object to be balanced, is released while still rotating. It will then exhibit a deviation from the axis of rotation against the said spring force due to its unbalance. It is then clamped again and in this new position the outer edge is turned to remove the unbalance. The stiffness of the spring system and the speed of rotation are chosen so that the unbalance is entirely eliminated. All this can be effected in one mounting and hence rapidly.

The invention further relates to a device for carrying out the method described above. This device is characterized in that it comprises a rotatable part of circular shape which is journalled in the device and is coupled to a drive and which has a central chamber in which are arranged means for holding a circular plate-shaped object, which means are coaxial with the rotatable part and are displaceable against spring force substantially in the plane of rotation of the rotatable part, clamping means being provided for clamping the plate-shaped object against the rotatable part and the device further comprising cutting means for turning the outer edge of the plate-shaped object.

The clamping means for clamping the object to be balanced against the rotatable part may be constructed in several ways.

In a favorable embodiment the clamping means are constituted by a further rotatable part of circular shape which is journalled in the device coaxially with the first-mentioned rotatable part, the two rotatable parts having circular clamping surfaces which face each other and being movable axially away from and towards each other.

In a further favorable embodiment the clamping means are constituted by openings in a surface of the rotatable part, which surface is arranged to support the plate-shaped object which openings can be connected alternately to a vacuum source and to a source of compressed air.

In a favorable embodiment the means for holding the plate-shaped object comprise one or more comparatively thin resilient legs which are located in said central chamber and which at one end carry a head which fits in a central hole of the object.

The invention will be described more fully with reference to the drawings.

Figure 1:
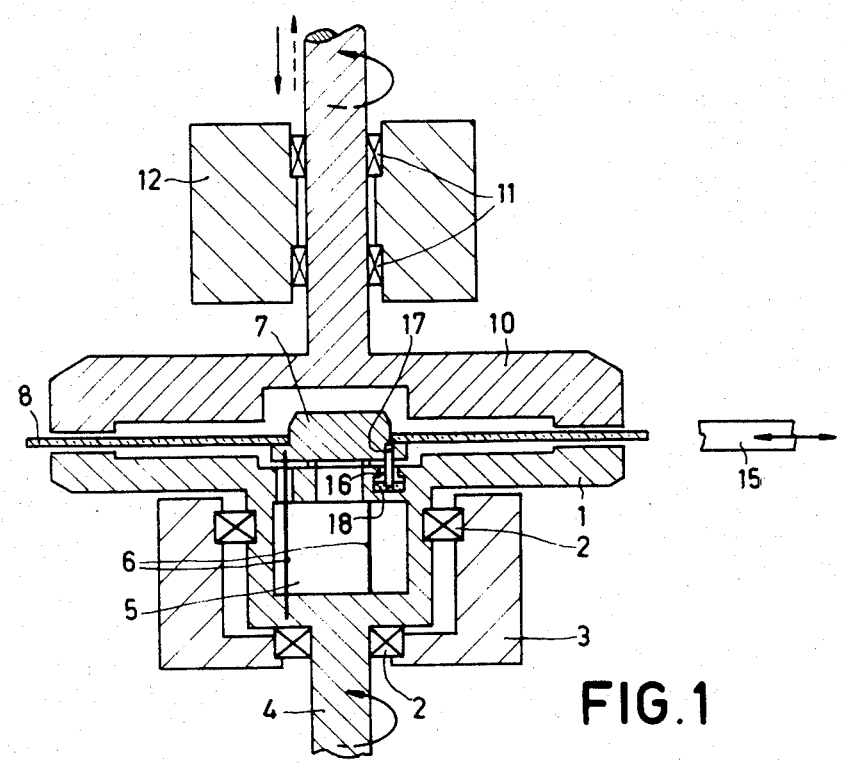
FIG. 1 shows diagrammatically in sectional view a device for balancing circular plate-shaped objects.

In FIG. 1, reference numeral 1 denotes a rotatable part of circular shape which is arranged for rotation about a vertical axis. This part is supported in both the axial and radial directions in bearings 2 in the fixed part 3 of the device. The part 1 is coupled through a shaft 4 to a drive not shown.

The part 1 is provided with a central chamber 5, in which three comparatively thin resilient legs are arranged which at one end are secured in the bottom of the chamber 5 and on their other ends carry a head 7 which fits in a central hole of a disc 8 which is to be rotationally balanced.

A further rotatable part 10 of circular shape is arranged coaxially with the part 1 and is journalled in bearings 11 in a part 12 which can be moved vertically by means not shown. The part 10 can be driven synchronously with the part 1 by means of a drive not shown.

The device further comprises a cutting tool 15, by means of which the outer edge of the plate-shaped object 8 can be machined.

The operation of this device is as follows.

A disc 8 to be rotationally balanced is disposed on the part 1 so that its central hole fits on the head 7. Subsequently, the part 10 is moved downwards so that the disc 8 is clamped between the two parts 1 and 10. The parts 1 and 10 are then driven up to a given speed of rotation. When this speed of rotation is reached, the part 10 is moved upwards to release the disc 8 which, together with the head 7, is now subjected to a deviation from the axis of rotation which is proportional to the degree of eccentricity of the center of gravity of the disc with respect to the center of the central hole of the disc. For a given speed of rotation (for example, the operational speed of rotation of the disc 8 when in use), the stiffness of the resilient legs 6 can be calculated so that the deviation due to rotational unbalance, which deviation is opposed by the spring force of the legs 6, is equal to half the eccentricity of the center of gravity of the disc.

The disc 8 is clamped in this new position by the part 10 and the outer edge of the disc 8 is then turned by means of the tool 15 to remove the unbalance. When the disc 8 is released, its center of gravity will lie at the center of the central hole of the disc.

When three resilient legs 6 are used, in its deviation from the axis of rotation of the device the head 7 will be displaced substantially in the plane of the disc 8 so that the disc 8 does not tilt. Thus, the disc 8 is prevented from coming into contact with one of the parts 1 and 10, which could adversely affect the accuracy. Of course, a different number of legs may also be used.

The head 7 is further provided with pins 17 which project into cavities 16 in the part 1. The cavities 16 are then partly filled with a viscous substance, for example, a grease. Any vibrations of the head 7 will be damped by movement of the pins 17 in the viscous substance in the cavities 16.

Figure 2:
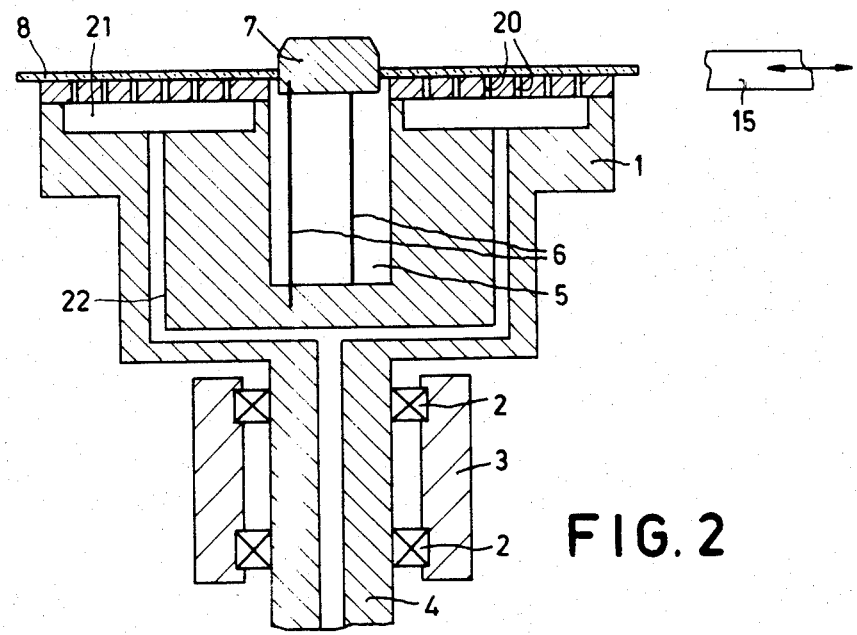
FIG. 2 shows diagrammatically in sectional view a device for balancing circular plate-shaped objects, the object being clamped by vacuum against a rotatable part of circular shape.

In the device shown in FIG. 1, the disc 8 is clamped on the part 1 by the part 10 and is released by raising the part 10. Alternatively, as shown in FIG. 2, the disc may be clamped on the part 1 by vacuum and released by compressed air. For this purpose, the upper surface of the part 1 is provided with a pattern of holes 20 opening into a subjacent space 21 which can be alternately connected through channels 22 to a source of compressed air and a vacuum source (not shown). The further operation and construction of this device is similar to that of the device shown in FIG. 1.

What is claimed is:

1. A method of balancing a circular plate-shaped object about a central axis of the object, the axis being perpendicular to the plane of the object, the method comprising:

providing mounting means which are movable against a spring force disposed in a plane;

centering the object on said mounting means with said object being disposed substantially in the plane of the spring force;

clamping the object against at least one rotatable part of said mounting means;

rotating the one rotatable part at a predetermined speed about a vertical axis;

then interrupting the clamping to release the object;

then clamping the object against the one rotatable part again;

then changing the contour of the outer edge of said object to achieve a balance.

2. A device for balancing a circular plate-shaped object which comprises:

means for mounting, said means for mounting including a first rotatable part of circular shape which is journalled in said means for mounting and is coupled to a drive which has a central chamber in which means for holding the circular plate-shaped object is disposed, said means for holding being coaxially with the rotatable part and movable against spring force substantially in the plane of rotation of the rotatable part;

clamping means for clamping the plate-shaped object against the first rotatable part; and cutting means for cutting the outer edge of the plate-shaped object.

3. A device as claimed in claim 2 wherein the means for holding the plate-shaped object comprises one or more comparatively resilient legs which are located in the central chamber and which at one axial extremity carry a head which fits in a central hole of the object.

4. A device as claimed in claim 2 wherein the means for clamping includes a second rotatable part of circular shape which is journalled into the device coaxially with the first rotatable part, the first and second rotatable parts having circular clamping surfaces which face each other and are movable axially away from each other and towards each other.

5. A device as claimed in claim 4 wherein the means for holding the plate-shaped object comprises one or more comparatively resilient legs which are located in the central chamber and which at one axial extremity carry a head which fits in a central hole of the object.

6. A device as claimed in claim 2 wherein the clamping means is constituted by openings in a surface of one of the rotatable parts, which surface includes means to support the plate-shaped object and means for connecting openings therein alternately to a vacuum source and to a source of compressed air.

7. A device as claimed in claim 6 wherein the means for holding the plate-shaped object comprises one or more comparatively resilient legs which are located in the central chamber and which at one axial extremity carry a head which fits in a central hole of the object.

* * * * *